(12) United States Patent
Hamrelius et al.

(10) Patent No.: US 8,289,372 B2
(45) Date of Patent: Oct. 16, 2012

(54) METHOD FOR DISPLAYING A THERMAL IMAGE IN AN IR CAMERA AND AN IR CAMERA

(75) Inventors: Torbjörn Hamrelius, Sollentuna (SE); Mats Ahlström, Sollentuna (SE)

(73) Assignee: Flir Systems AB, Danderyd (SE)

( * ) Notice: Subject to any disclaimer, the term of this patent is extended or adjusted under 35 U.S.C. 154(b) by 1177 days.

(21) Appl. No.: 11/549,667

(22) Filed: Oct. 16, 2006

(65) Prior Publication Data

US 2008/0265162 A1  Oct. 30, 2008

(51) Int. Cl.
*H04N 9/43* (2006.01)
*G02F 1/01* (2006.01)
*H01L 25/00* (2006.01)

(52) U.S. Cl. .................... 348/32; 250/330; 250/332

(58) Field of Classification Search ............. 250/330; 348/32
See application file for complete search history.

(56) References Cited

U.S. PATENT DOCUMENTS

| | | | |
|---|---|---|---|
| 4,020,344 A * | 4/1977 | Kerschbaum | 250/330 |
| 4,236,403 A | 12/1980 | Poppendiek | |
| 4,555,764 A | 11/1985 | Kuehn | |
| 4,647,220 A * | 3/1987 | Adams et al. | 374/5 |
| 4,647,221 A | 3/1987 | Szabo | |
| 4,999,614 A * | 3/1991 | Ueda et al. | 340/588 |
| 5,115,967 A | 5/1992 | Wedekind | |
| 5,396,068 A * | 3/1995 | Bethea | 250/330 |
| 5,877,688 A | 3/1999 | Morinaka et al. | |
| 6,840,667 B2 * | 1/2005 | Schlagheck et al. | 374/5 |
| 7,034,300 B2 | 4/2006 | Hamrelius et al. | |
| 7,220,966 B2 * | 5/2007 | Saito et al. | 250/341.6 |
| 7,340,162 B2 * | 3/2008 | Terre et al. | 396/275 |
| 7,513,964 B2 * | 4/2009 | Ritter et al. | 156/64 |
| 7,528,372 B2 * | 5/2009 | Garvey et al. | 250/330 |
| 7,748,197 B2 | 7/2010 | Romes et al. | |
| 7,851,758 B1 | 12/2010 | Scanlon et al. | |
| 2002/0116239 A1 | 8/2002 | Reinsma et al. | |
| 2003/0123518 A1 * | 7/2003 | Abbasi et al. | 374/124 |
| 2004/0245467 A1 * | 12/2004 | Lannestedt | 250/330 |
| 2009/0302219 A1 * | 12/2009 | Johnson et al. | 250/332 |

OTHER PUBLICATIONS

Application of Infrared Sensing Devices to the Assessment of Building Heat Loss Characteristics, ANSI/ASHRAE 101-1981, The American Society of Heating, Refrigerating, and Air-Conditioning Engineers, Inc., 1983, 33 pages.

(Continued)

*Primary Examiner* — Joseph Ustaris
*Assistant Examiner* — Frederick Bailey
(74) *Attorney, Agent, or Firm* — Hanyes and Boone, LLP

(57) ABSTRACT

The invention is achieved by using a method for displaying a thermal image in an infrared (IR) thermal camera, comprising the steps of registering an outdoor temperature value, registering an indoor temperature value, calculating an isotherm level by using the registered temperature values and a temperature color alarm level, imaging a surface area to create an image of the temperature distribution in at least a part of the surface area, comparing the surface area temperature in at least one image point of the thermal image to the isotherm level, adjusting the color of the at least one image point in dependence of the relation between the surface area temperature in said at least one image point and the isotherm level and displaying the colored thermal image.
The invention allows you to determine immediately, on-site, if a building is well insulated or not. It presents an easily interpreted and understandable thermal image which instantly draws a users attention to an identified critical area.

14 Claims, 5 Drawing Sheets

OTHER PUBLICATIONS

D.W.J. Hamoen, New low-cost residential energy audit technique, Thermal Energy Devices, SPIE vol. 313 Thermosense IV, 1981, pp. 35-44.

Flanders et al., Interpolating R-values from thermograms, U.S. Army Cold Regions Research and Engineering Laboratory, SPIE vol. 313 Thermosense IV, 1981, pp. 157-164.

* cited by examiner

METHOD FOR DISPLAYING A THERMAL IMAGE IN AN IR CAMERA AND AN IR CAMERA

TECHNICAL FIELD

The present invention relates to a method for displaying a surface area temperature using indoor and outdoor temperature measurements in an infrared (IR) thermal camera, and in particular for displaying critical areas when monitoring and inspecting the condition of buildings.

BACKGROUND OF THE INVENTION

IR cameras can be used in a number of different situations, for example, when inspecting buildings or walls looking for areas with missing or bad insulation, structural damages, for example missing reinforcements, cracks in concrete walls, moisture, or water damages.

An infrared (IR) camera is used for capturing, displaying and storing thermal images. In addition to the thermal data of the captured objects other types of information, for example text and/or voice comments, visual images and environmental data, can also be digitally attached to the thermal image.

It is of great interest not only to view the thermal images but also to be able to tell the different temperatures of different objects, or parts of objects, in the thermal image, to analyze and draw the right conclusion from the data, and to take appropriate action.

However, a thermal image represents the temperature of an object or objects and may differ significantly from a visual image. This leads to difficulties in interpreting and identifying the location of objects shown in the infrared image. The difficulties and uncertainties in interpreting the infrared images also slow down the inspections since the operator often has to look closer and from different angles to be really sure that he has identified the right target, in which the thermal anomaly is actually found.

Further, it can also lead to an operator completely missing a thermal anomaly since the thermal anomaly is not clearly defined and could be hard to recognize just by looking at the thermal image.

Therefore, there is a need to have thermal images presented in a way easy to understand and interpret.

OBJECT OF THE INVENTION

It is an object of the present invention to enable the identification of deficiencies in the thermal transmission properties of a building construction.

SUMMARY OF THE INVENTION

The object of the invention is achieved by using a method for displaying a thermal image in an infrared (IR) thermal camera, comprising the steps of registering an outdoor temperature value, registering an indoor temperature value, calculating an isotherm level by using the registered temperature values and a temperature color alarm level, imaging a surface area to create an image of the temperature distribution in at least a part of the surface area, comparing the surface area temperature in at least one image point of the thermal image to the isotherm level, adjusting the color of the at least one image point in dependence of the relation between the surface area temperature in said at least one image point and the isotherm level and displaying the colored thermal image.

Since the order of the steps is not essential to the invention, the steps may be performed in any suitable order.

The object of the present invention is also achieved by providing an infrared (IR) thermal camera comprising focusing means for focusing incoming IR radiation from an object in the IR camera to generate a image signal corresponding to the incoming IR radiation, to be passed to a signal conditioning unit for signal conditioning, the conditioned image signal output being passed to a color adjusting means which in dependence of temperature values registered via temperature input means and temperature calculation means, is arranged to display a thermal image via a display. The calculating means is arranged to calculate, on the basis of at least two registered temperature values and a temperature color alarm level, an isotherm level.

The color adjusting means is arranged to compare the surface area temperature in at least one image point of the thermal image to the isotherm level, and adjust the color in at least one image point of the thermal image in dependence of the relation between the surface area temperature in said at least one image point and the isotherm level.

An advantage of the above described invention is that it allows you to determine immediately, on-site, if a building is well insulated or not. It presents an easily interpreted and understandable thermal image which instantly draws a users attention to an identified critical area.

The method can also comprise the step of having the temperature color alarm level registered in the IR camera manually, as an alternative to being calculated or preset. The infrared (IR) thermal camera preferably comprises receiving means for receiving the temperature color alarm level manually. However, this information could, for example, also be calculated automatically by the calculating means or be provided by a preset value.

Preferably the method also comprises the step of calculating the thermal transmission coefficients of an object in the thermal image using the registered temperature values. In the IR camera this is preferably done by the calculating means.

This feature advantageously provides the user with an opportunity to determine whether or not, for example, a wall fulfils the thermal transmission properties guaranteed by a contractor or a supplier.

Preferably the method further comprises the step of registering the air humidity level when registering a temperature measurement and compensating for said air humidity level when displaying the thermal image. For this purpose, the infrared (IR) thermal camera preferably comprises humidity input means.

This feature increases the accuracy of the temperature measurements.

Preferably the method further comprises the step of registering the distance between a captured object and the IR camera as the IR camera captures a thermal image and compensating for said distance when displaying the thermal image. For this purpose, the infrared (IR) thermal camera preferably comprises distance input means.

This feature further increases the accuracy of the temperature measurements.

The advantages of the above mentioned features make the present invention exceptionally suited for common applications of an IR-camera such as detecting areas susceptible to mold build-up, finding badly insulated areas, supervising new constructions, finding leaks in underground pipes, planning redevelopments and many more.

BRIEF DESCRIPTION OF THE DRAWINGS

In the following the invention will be described in more detail, by way of embodiments and with reference to the appended drawings, in which.

DESCRIPTION OF THE PREFERRED EMBODIMENTS

Figure 1:
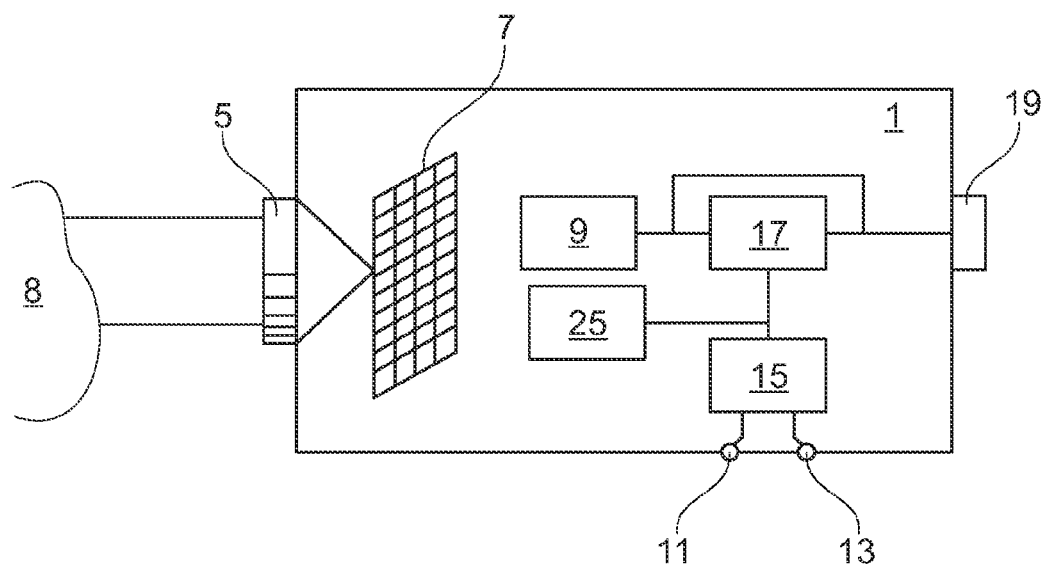
FIG. 1 shows an IR camera according to a first embodiment of the invention.

FIG. 1 shows an IR camera according to the invention. For registering IR images the camera unit 1 comprises the same functions as prior art cameras. The gathering of data and the data processing performed prior to displaying the image are carried out in the conventional way. This technology is known to the skilled person, but will be briefly discussed in the following. The incoming radiation to the camera is focused by at least one lens 5 onto a detector array 7. The detector array is typically a matrix of detector elements, each detecting radiation from a corresponding area on an object 8, e.g. a wall, being imaged. From the detector array the image signal is fed to a signal conditioning unit 9 which performs conventional signal conditioning such as corrections for the inherent offset and gain drift.

It should be noted that the IR camera does not necessarily comprise a focal plane array. The inventive concept can also be implemented in an IR camera using an IR scanner.

According to the invention, the IR camera also comprises temperature input means 11 for receiving from a temperature sensor, information about the temperature in the air surrounding the object. The temperature input means 11 may be adapted for wired or wireless communication with the respective sensors. Alternatively, information about the air temperature may be measured separately and input to the camera in another way, e.g. manually.

The IR camera could further include humidity input means 13 for receiving, from a humidity sensor, information about the atmospheric humidity in the air surrounding the object 8.

The temperature sensor input means 11 forwards the air temperature information to a temperature calculation unit 15 arranged to calculate, on the basis of said air temperature information and a temperature color alarm level, a calculated isotherm level, which defines the lowest temperature level the surface area temperature of the object 8 must have in order to be considered acceptable.

The temperature color alarm level could be a preset value, a manually inputted value or a value registered in some other way known in the art.

From the signal conditioning unit 9 the registered image of the object 8 passes to a color adjusting unit 17 arranged to compare the registered temperature in each point of the image of the object 8 to the calculated isotherm level received from the temperature calculation unit 15, and color the image points according to a color scheme defined by a temperature color alarm, depending on if the registered temperature in the image points is below, equal to or above the calculated isotherm level.

The color adjusting unit also displays the image to the viewer in a viewfinder and/or a display 19, in a conventional way. The image, the temperature information, the temperature color alarm level and the isotherm level can also be stored, in the storage means 25 in the camera or outside the camera in ways common in the art.

Figure 2B:
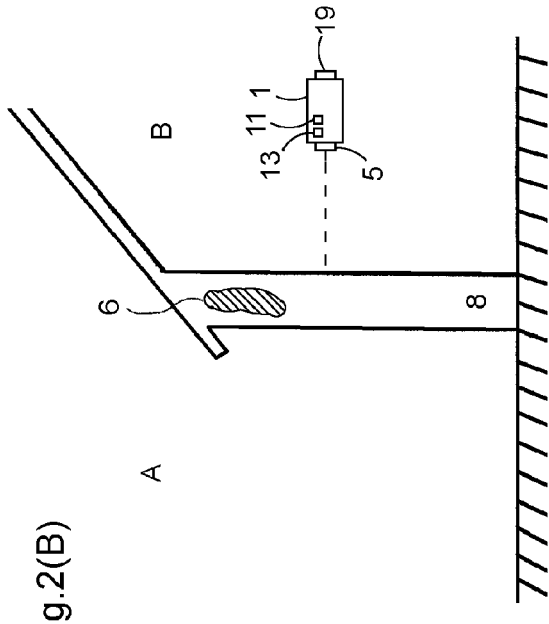
FIG. 2(B) shows a cross-section of a house wall and an IR camera according to the invention located on the inside.
Figure 2A:
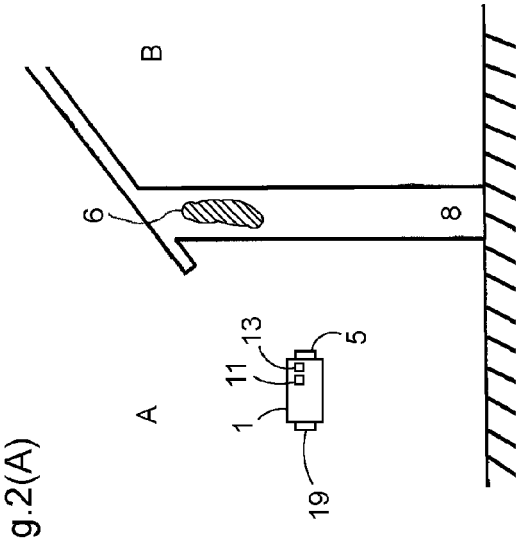
FIG. 2(A) shows a cross-section of a house wall and an IR camera according to the invention located on the outside.
Figure 2C:
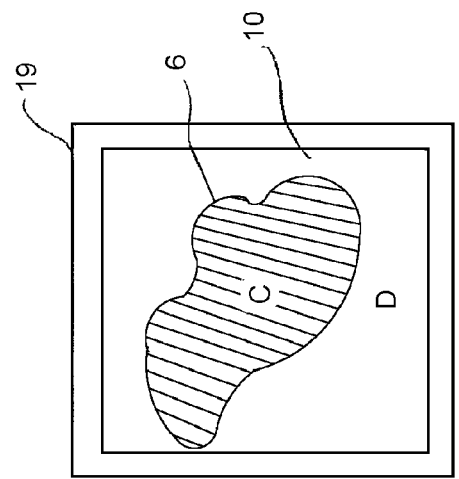
FIG. 2(C) shows an IR camera display illustrating the temperature color alarm according to the invention.

FIGS. 2(A), 2(B) and 2(C) illustrate how the present invention is used to detect a fault 6 in a house wall 8 and alert a user by presenting a thermal image 10, which includes a temperature color alarm, on the display 19.

In FIG. 2(A), an IR camera 1 according to the invention is located on the outside A of a house wall 8, separating the inside B from the outside A of the house. In the house wall 8 there is a deficiency 6. This deficiency 6 could be caused by any number of reasons, for example, poor wall insulation, poor insulation material, poor wall material, a faulty construction, water damage or leakage etc. Deficiencies as the one above cause heat leakage from the inside B to the outside A of the house and thus provide the construction with insufficient insulation.

When the IR camera 1 is located on the outside A of the house, as in FIG. 2(A), a user of the IR camera 1 can manually select for the temperature input means 11 to register an outdoor temperature value, $T_A$.

After having registered an outdoor temperature value, a user can go into the house, as illustrated in FIG. 2(B), and there manually select for the temperature input means 11 to register an indoor temperature value $T_B$, or the indoor temperature value $T_B$ could be automatically registered by the temperature input means 11 as the IR camera 1 starts imaging.

The opposite registering procedure is of course equally applicable, that is, first registering an indoor temperature value $T_B$ on the inside of the house and then go outside to register an outdoor temperature value, $T_A$, when imaging from the outside. The registered outdoor temperature value, $T_A$, and indoor temperature value, $T_B$, can be stored in the storage means 25 in the IR camera 1, as shown in FIG. 1, or outside the camera in ways common in the art. A user can also, of course, register the temperature values manually by inputting temperature values measured separately outside of the IR camera.

In addition to the registered and stored outdoor, $T_A$, and indoor, $T_B$, temperature values, the user can, for example, manually input a temperature color alarm level, $T_{CAL}$, defining an accepted percentage of the maximum amount of heat transfer from the inside B of the wall 8 to the outside A of the wall 8.

The information about the air temperatures, that is, the registered outdoor and indoor temperatures ($T_A$, $T_B$) and the temperature color alarm level ($T_{CAL}$), is forwarded to a temperature calculation unit 15 arranged to calculate, on the basis of the air temperature information, an isotherm level, $T_{ISO}$. According to one embodiment the isotherm level, $T_{ISO}$, is determined according to the following formula $$T_{ISO} = T_B - \left(\frac{(100 - T_{CAL})}{100}\right) \times (T_B - T_A),$$

and defines the lowest accepted surface temperature of the imaged object 8.

As the lens 5 of the IR camera 1 is directed towards the wall 8 and starts imaging, as illustrated in FIG. 2(B), the color adjusting unit 17 is arranged to compare the surface area temperature in each point of the image of the wall 8 to the isotherm level, $T_{ISO}$, received from the temperature calculation unit 15.

The color adjusting unit 17 identifies image points in which the surface area temperature is lower than the isotherm level, $T_{ISO}$, and also changes the color of all such points to a particular color according to a color scheme defined by a temperature color alarm. For example, the temperature color alarm could define a color scheme in which all identified points are highlighted by one specific transparent color, e.g. red, green etc., or in which all identified points are colored in dependence of how far below the isotherm level, $T_{ISO}$, the surface area temperature in that point is, e.g. different or brighter/darker colors, or a combination of the two.

In one embodiment, the temperature color alarm, as can be seen in FIG. 2(C), will cause the color adjusting unit 17 to change the color of the areas in thermal image 10 where the surface area temperature is below the isotherm level, $T_{ISO}$, that is, the area of the deficiency 6, into one particular, transparent color C.

The rest of the image area, that is, the area where the surface area temperature is equal to or above the isotherm level, $T_{ISO}$, the area D in FIG. 2(C), will be changed by the color adjusting unit 17 into grey scale.

Figure 3:
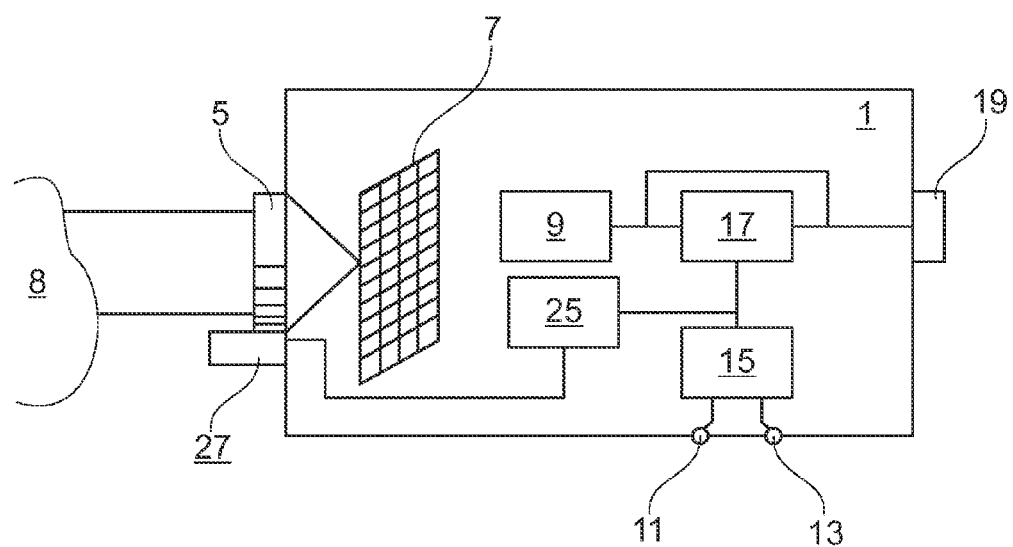
FIG. 3 shows an arrangement according to a second embodiment of the invention.

Of course, the division of the functions performed in units 9, 15 and 17 is merely done to illustrate the functions of the camera. In reality they may be performed in one or two, or more units in the camera 1 or, as depicted in FIG. 3, even outside of the camera 1. Preferably, as indicated in FIG. 1 by a solid line directly from the signal conditioning unit 9 to the viewer, the modification of the image may be bypassed so that a conventional IR image is shown on the display 19 of the IR camera.

There are two additional features preferably present in the IR camera 1 that could increase the accuracy of the measurements and be used when displaying thermal image 10 according to the temperature color alarm. These additional features can be implemented together or independently of each other in the IR camera The first additional feature, discussed with reference to FIG. 1, is the humidity input means 13 including a humidity sensor, which could be arranged to measure the atmospheric humidity level and since the humidity can affect temperature measurements, the atmospheric humidity level could be compensated for when displaying the captured thermal image 10 according to the temperature color alarm.

The humidity input means 13 may be adapted for wired or wireless communication with the respective sensors. Alternatively, information about the atmospheric humidity level may be measured separately and input to the camera in another way, e.g. manually. The measured atmospheric humidity level can also be stored in the storage means 25 in the IR camera 1, as shown in FIG. 1, or outside the camera in ways common in the art.

The second additional feature, according to a second embodiment shown in FIG. 3 in which the reference numerals refers to the same objects as in FIG. 1, is for the IR camera to include distance input means 27, for example, a laser measuring device, arranged to register and store the distance between the captured object 8 and the IR camera 1, which also could be compensated for when displaying the captured thermal image 10 according to the temperature color alarm. Alternatively, information about the distance between the captured object 8 and the IR camera 1 may be measured separately and input to the camera in another way, e.g. manually.

The measured distance can also be stored in the storage means 25 in the IR camera 1, as shown in FIG. 1, or outside the camera in ways common in the art.

This second additional feature can of course be implemented in an IR camera also including the previously mentioned feature in order to achieve as accurate measurements as possible.

Figure 4:
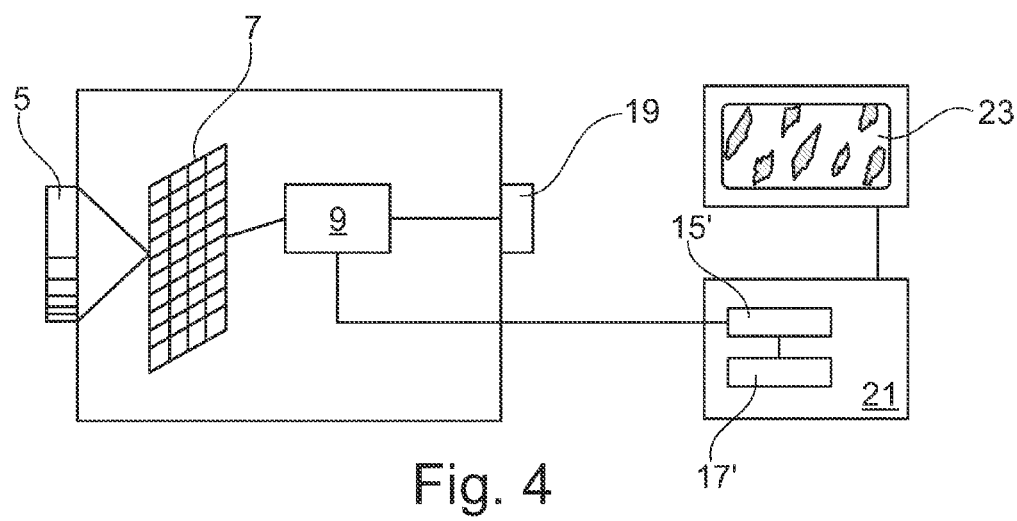
FIG. 4 shows an arrangement according to a third embodiment of the invention.

Alternatively, as depicted in FIG. 4, the camera can be a conventional IR camera 1' as shown in FIG. 1, arranged to output a temperature dependent image of the object 8. As before, incoming IR radiation from the object 8 is focused by a focusing system 5 onto a focal plane array 7 or onto the scanning device, depending on the type of IR camera used. The signal from the focal plane array 7 (or scanning device) is fed to a signal conditioning unit 9. The output image from the signal conditioning unit 9 can then be transferred to a computer 21, as is well known in the art. The information about the air temperature and atmospheric humidity may be registered by sensors and stored in storage means (not shown) in the camera or may be entered into the computer manually. The computer then comprises units 15', 17' corresponding to the temperature calculation unit 15 and the color adjusting unit 17 of FIG. 1. The adjusted image, indicating in accordance with a color scheme defined by the temperature color alarm the areas where deficiencies may be present, can then be displayed on the computer screen 23 and also be stored in storage means preferably present in the computer.

According to a fourth embodiment, the IR camera 1 could comprise calculating means further arranged to calculate thermal transmission coefficients using the indoor and outdoor temperature measurements, as described in connection to FIG. 2(A), 2(B) and 2(C), together with thermal images.

However, this requires that the user inputs additional information manually, for example, information regarding the construction of the wall, what kind of building materials, etc. For example, a static one-dimensional thermal transmission coefficient Q can be calculated using the indoor and outdoor temperature measurements ($T_A$, $T_B$) according to the following formula:

$$Q = \frac{\lambda}{d}(T_A - T_B)$$

where $\lambda$ is an approximation of the thermal conductivity of a wall and d is the thickness of the wall, both of which have to be manually registered in the IR camera. This simple and general example illustrates how wall properties can be calculated using the present invention, but should not be considered limited towards more complex calculations and analyses.

The calculated thermal transmission coefficients can be stored in the storage means 25 in the IR camera 1 or outside the camera in ways common in the art.

Figure 5:
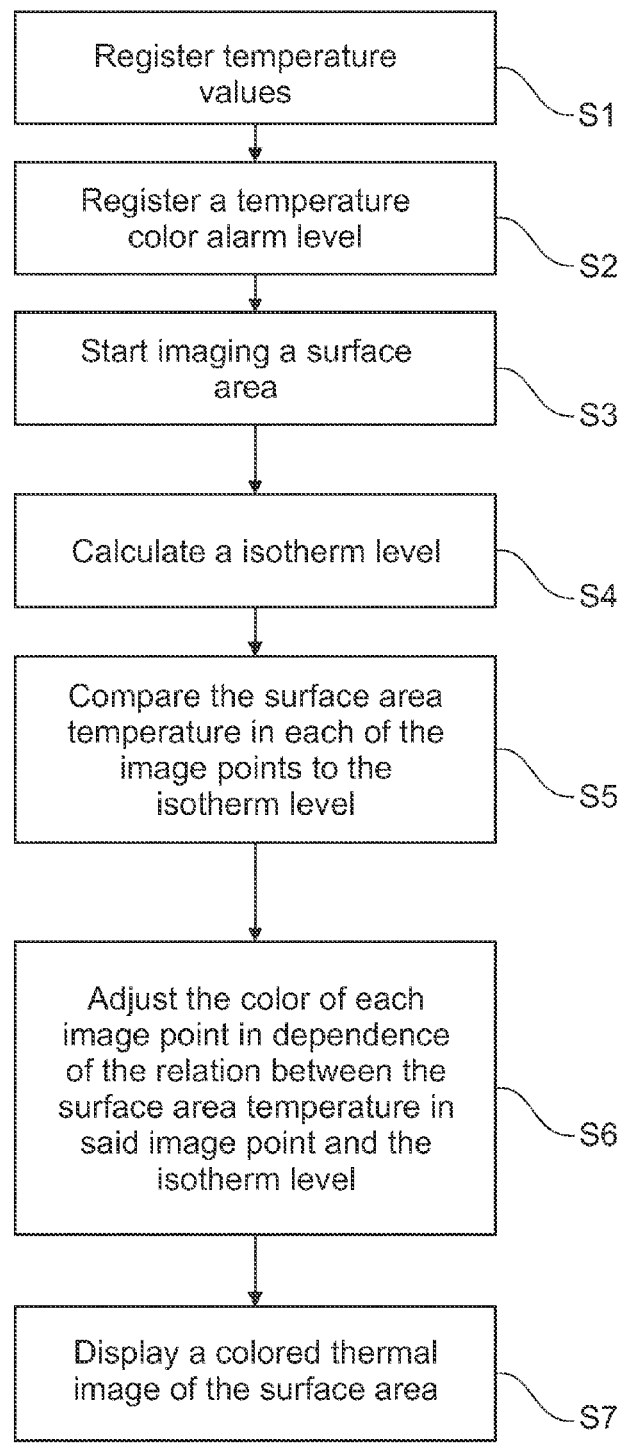
FIG. 5 is a flowchart describing a procedure according to the present invention.

The flowchart in FIG. 5 describes the steps of the procedure according to an embodiment of the present invention.

In step S1, an outdoor temperature value is preferably registered if the imaging is performed on a surface area inside of the house. An indoor temperature value is preferably registered if the imaging is performed on a surface area outside of the house. The temperature value can be registered manually or automatically by using the temperature sensor in the IR camera.

In step S2, a temperature color alarm level is set. The temperature color alarm level can be provided by manually registering a value or by using a preset value.

In step S3, the IR camera starts imaging a surface area.

In step S4, an isotherm level is calculated by using the registered temperature value, the temperature color alarm level and a second temperature value, which is registered automatically by the temperature sensor in the IR camera as it starts imaging. The second temperature value is then either an indoor temperature value if the imaging is performed on a surface area inside of the house or an outdoor temperature value if the imaging is performed on a surface area outside of the house.

Optionally step S4 can be performed prior to step S3, wherein the isotherm level is calculated before the IR camera starts imaging. This can be done by registering the second temperature value either manually or by using the temperature sensor of the IR camera prior to the imaging.

In step S5, the temperature level in each image point is compared to the calculated isotherm level.

In step S6, the color in each image point is adjusted according to a color scheme defined by the temperature color alarm on the basis of the relation between the temperature level in the image point and the isotherm level.

In step S7, the color adjusted thermal image is displayed.

As a result of the temperature color alarm, the thermal image 10 presented by the display 19 when the user scans over the wall will clearly define and highlight the area of the deficiency 6, thereby alerting the user of where the construction is faulty. The temperature color alarm could also be arranged to draw the user's attention by producing an audible alert at the same time.

In addition to deficiencies in a wall, the IR camera 1 can of course be used to identify any area of a wall 8 where there is some form of heat loss.

As a further example the temperature color alarm could be used when confirming the expected quality of the work done by a contractor or a product delivered by a supplier, and thereby ensuring that the construction is correctly built and up to code.

The invention claimed is:

1. A method for displaying a colored thermal image in an infrared (IR) thermal camera to detect thermal transmission through a partition separating an outside and an inside of a construction, the method comprising:
registering a first air temperature value ($T_A$) on the outside of the construction;
registering a second air temperature value ($T_B$) on the inside of the construction;
calculating a temperature level value ($T_{ISO}$) based on the registered first air temperature value ($T_A$), the registered second air temperature value ($T_B$), and a temperature color alarm level value ($T_{CAL}$);
imaging a surface area of the partition located between the outside and the inside of the construction, to create the thermal image of a temperature distribution in at least a part of the surface area;
comparing a surface area temperature in at least one image point of the thermal image to the temperature level value ($T_{ISO}$);
adjusting a color of the at least one image point in dependence of the relation between the surface area temperature in the at least one image point and the temperature level value ($T_{ISO}$), to create a colored version of the thermal image; and
displaying the colored version of the thermal image.

2. A method according to claim 1, wherein the temperature color alarm level value ($T_{CAL}$) is registered in the IR camera manually.

3. A method according to claim 1, comprising calculating thermal transmission coefficients of the partition in the colored version of the thermal image using the registered first air temperature value ($T_A$) and the registered second air temperature value ($T_B$).

4. A method according to claim 1, comprising:
registering an air humidity level when registering the first air temperature value ($T_A$) and/or the second air temperature value ($T_B$); and
compensating for the registered air humidity level when displaying the colored version of the thermal image.

5. A method according to claim 1, comprising:
registering a distance between the partition and the IR camera as the IR camera captures the thermal image; and
compensating for the registered distance when displaying the colored version of the thermal image.

6. A method according to claim 1, wherein the temperature color alarm level value ($T_{CAL}$) defines an accepted percentage of a maximum amount of heat transfer for the partition between the inside of the construction and the outside of the construction.

7. A method according to claim 1, wherein the temperature level value ($T_{ISO}$) defines a lowest accepted surface temperature of the partition.

8. An infrared (IR) thermal camera, comprising:
a lens configured to focus incoming IR radiation from an object, representing a portion of a structure, for the IR camera to generate an image signal corresponding to the incoming IR radiation;
a processor configured to perform signal conditioning for the image signal, the signal conditioning comprising corrections for inherent offset and gain to provide a conditioned image signal output;
a color adjusting unit, which in dependence of temperature values registered via temperature input means and processed by the processor, is configured to display a thermal image via a display;
wherein the processor is configured to calculate, on the basis of at least a first registered air temperature value ($T_A$) for outside the structure, a second registered air temperature value ($T_B$) for inside the structure via the temperature input means, and a temperature color alarm level value ($T_{CAL}$), a temperature level value ($T_{ISO}$); and
wherein the color adjusting unit is configured to compare a surface area temperature in at least one image point of the thermal image to the temperature level value ($T_{ISO}$) and adjust the color in the at least one image point of the thermal image in dependence of the relation between the surface area temperature in the at least one image point and the temperature level value ($T_{ISO}$), to create a colored version of the thermal image.

9. An infrared (IR) thermal camera according to claim 8, comprising receiving means for receiving a temperature color alarm level value ($T_{CAL}$) manually.

10. An infrared (IR) thermal camera according to claim 8, wherein the processor is configured to calculate, on the basis of the first and second registered air temperature values ($T_A$, $T_B$), thermal transmission coefficients of the object in the colored version of the thermal image.

11. An infrared (IR) thermal camera according to claim 8, comprising humidity input means—for receiving at least one atmospheric humidity value, and wherein the processor is configured to compensate for the atmospheric humidity value when determining the temperature level value ($T_{ISO}$).

12. An infrared (IR) thermal camera according to claim 8, further comprising distance input means for receiving an object distance value, and wherein the processor is configured to compensate for the object distance value when determining the temperature level value ($T_{ISO}$).

13. An infrared (IR) thermal camera according to claim 8, wherein the temperature color alarm level value ($T_{CAL}$) defines an accepted percentage of a maximum amount of heat transfer for the object between the inside and the outside of the structure.

14. An infrared (IR) thermal camera according to claim 8, wherein the temperature level value ($_{ISO}$) defines the lowest accepted surface temperature of the object.

* * * * *